(12) United States Patent
Yoon

(10) Patent No.: US 9,327,700 B2
(45) Date of Patent: May 3, 2016

(54) ELECTRIC PARKING BRAKE APPARATUS

(71) Applicant: MANDO CORPORATION, Pyeongtaek-si (KR)

(72) Inventor: Jae Seop Yoon, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 54 days.

(21) Appl. No.: 14/306,043

(22) Filed: Jun. 16, 2014

(65) Prior Publication Data
US 2015/0053513 A1    Feb. 26, 2015

(30) Foreign Application Priority Data

Aug. 21, 2013  (KR) .................. 10-2013-0098879

(51) Int. Cl.
| | | |
|---|---|---|
| B60T 13/74 | (2006.01) | |
| F16D 65/00 | (2006.01) | |
| F16D 65/14 | (2006.01) | |
| F16D 121/24 | (2012.01) | |
| F16D 125/52 | (2012.01) | |
| F16D 125/60 | (2012.01) | |
| F16D 125/64 | (2012.01) | |

(52) U.S. Cl.
CPC ............ B60T 13/741 (2013.01); B60T 13/746 (2013.01); F16D 65/00 (2013.01); F16D 65/14 (2013.01); *F16D 2121/24* (2013.01); *F16D 2125/52* (2013.01); *F16D 2125/60* (2013.01); *F16D 2125/64* (2013.01)

(58) Field of Classification Search
CPC ..... B60T 13/741; B60T 13/746; F16D 65/00; F16D 65/14; F16D 65/563; F16D 2125/52; F16D 2125/42; F16D 2125/64; F16D 2125/60; F16D 2121/24

USPC ................... 188/196 V; 74/96, 425
See application file for complete search history.

(56) References Cited

U.S. PATENT DOCUMENTS

| | | | | |
|---|---|---|---|---|
| 2,113,817 | A * | 4/1938 | Sneddon ............... | F16K 31/465 188/196 V |
| 2,251,521 | A * | 8/1941 | McIntyre .............. | B60T 11/105 188/162 |
| 2,350,636 | A * | 6/1944 | Piron ...................... | B60T 13/74 188/156 |
| 2,725,131 | A * | 11/1955 | Martin .................. | B60T 13/746 192/219.6 |
| 2,899,022 | A * | 8/1959 | White .................... | B60T 13/74 180/315 |
| 3,590,653 | A * | 7/1971 | Dreckmann ............. | F16H 1/20 60/39.27 |
| 3,768,325 | A * | 10/1973 | Kucharski, Jr. ......... | F16D 71/00 338/DIG. 1 |
| 3,866,486 | A * | 2/1975 | Lechner ................... | F16H 1/16 74/425 |
| 4,425,815 | A * | 1/1984 | Norton ..................... | B22F 5/08 298/893.31 |
| 4,650,056 | A * | 3/1987 | Sevennec .............. | B60T 13/741 192/90 |

(Continued)

FOREIGN PATENT DOCUMENTS

| | | | | | |
|---|---|---|---|---|---|
| JP | | 62214039 A | * | 9/1987 | .......... F16D 2125/62 |
| JP | | 62231857 A | * | 10/1987 | ............ F16K 31/465 |

*Primary Examiner* — Xuan Lan Nguyen
(74) *Attorney, Agent, or Firm* — Ladas & Parry, LLP

(57) ABSTRACT

The present invention relates to an electric parking brake apparatus. According to an embodiment of the present invention, a worm shaft is formed with a first protrusion, a rotating member is formed with a second protrusion, and after the rotating member rotates by a preset rotation angle, the first protrusion of the worm shaft contacts the second protrusion of the rotating member so that the worm shaft cannot rotate any more, thereby preventing a gear jam due to over-release of the rotating member.

4 Claims, 3 Drawing Sheets

(56) References Cited

U.S. PATENT DOCUMENTS

| | | | | |
|---|---|---|---|---|
| 4,750,596 A * | 6/1988 | Grunberg | B60T 13/741 | |
| | | | 188/83 | |
| 5,004,077 A * | 4/1991 | Carlson | B60T 7/107 | |
| | | | 188/162 | |
| 5,295,730 A * | 3/1994 | Rees | B60N 2/2231 | |
| | | | 297/354.12 | |
| 5,350,043 A * | 9/1994 | Crewson | F16D 65/60 | |
| | | | 188/196 BA | |
| 5,513,543 A * | 5/1996 | Carlson | B64C 13/04 | |
| | | | 464/39 | |
| 2002/0027386 A1 * | 3/2002 | Yanaka | B60T 8/32 | |
| | | | 303/3 | |
| 2007/0029142 A1 * | 2/2007 | Drennen | F16D 65/18 | |
| | | | 188/72.7 | |
| 2013/0062148 A1 * | 3/2013 | Park | B60T 13/741 | |
| | | | 188/72.1 | |

\* cited by examiner

ELECTRIC PARKING BRAKE APPARATUS

CROSS-REFERENCE TO RELATED APPLICATION

This application claims priority from and the benefit under 35 U.S.C. §119(a) of Korean Patent Application No. 10-2013-0098879, filed on Aug. 21, 2013, which is hereby incorporated by reference for all purposes as if fully set forth herein.

BACKGROUND OF THE INVENTION

1. Field of the Invention

The present invention relates to an electric parking brake apparatus. More particularly, the present invention relates to an electric parking brake apparatus in which a worm shaft is formed with a first protrusion, a rotating member is formed with a second protrusion, and after the rotating member rotates by a preset rotation angle, the first protrusion of the worm shaft contacts the second protrusion of the rotating member so that the worm shaft cannot rotate any more, thereby preventing a gear jam due to over-release of the rotating member.

2. Description of the Prior Art

In general, a parking brake apparatus is used to restrain wheels so as to stop a vehicle such that it is immobilized, when a driver parks the vehicle.

Such a parking brake apparatus may be classified into a manual type in which, when a driver directly pulls a parking brake lever, a parking cable connected to the parking brake lever is pulled so that wheels are restrained, and an electric type in which, when a driver manipulates a switch, an apparatus configured with an electric motor and a gear unit pulls a parking cable so that wheels are restrained.

FIG. 1 illustrates a schematic configuration of an electric parking brake apparatus according to the related art.

As illustrated in FIG. 1, the electric parking brake apparatus according to the related art includes a parking gear 105 including a protrusion 101 protruding from a portion of an outer periphery of the parking gear, wherein a parking cable 103 is secured to a surface spaced apart from a center of the parking gear; a tension sensor 107 provided at the parking cable 103; a release switch 109 operated by the protrusion 101 to be rotated by a predetermined angle; an operation member 111 operating the parking gear 105 while being connected with the tension sensor 107 and the release switch 109; an electronic control device 113 connected with the release switch 109 and the tension sensor 107; and a parking brake switch 115 connected with the electronic control device 113 and mounted to a center fascia.

An example of operating the conventional electric parking brake apparatus having the above-described configuration will be described. When a driver turns on the parking brake switch 115 to operate the parking brake, the electronic control device 113 operates a motor 119 of the operation member 111 through the tension sensor 107, and the parking gear 105 engaged with a worm gear 121 rotates in one direction. Accordingly, the parking cable 103 is pulled, and a rear cable 125 is pulled through an equalizer 123 so that wheels are restrained.

In contrast, when the driver turns off the parking brake switch 115 or manipulates an accelerator pedal switch 117 to release the parking brake, the electronic control device 113 operates the motor 119 of the operation member 111 through the tension sensor 107, and the parking gear 105 engaged with the worm gear 121 rotates in the other direction. Accordingly, the pulled parking cable 103 is loosened, and the rear cable 125 is loosened through the equalizer 123 so that the wheels are released.

Meanwhile, when the protrusion 101 contacts the release switch 109 while the parking gear 105 rotates in the other direction, the electronic control device 113 shuts the motor 119 down such that the parking gear 105 does not rotate any more.

However, in the conventional electric parking brake apparatus having the above-described configuration, when the parking gear is over-released on account of a malfunction of the release switch, the parking brake does not operate due to a gear jam between the worm gear and the parking gear.

SUMMARY OF THE INVENTION

The present invention has been made in an effort to solve the above-described problems associated with prior art. An aspect of the present invention is to provide an electric parking brake apparatus in which a worm shaft is formed with a first protrusion, a rotating member is formed with a second protrusion, and after the rotating member rotates by a preset rotation angle, the first protrusion of the worm shaft contacts the second protrusion of the rotating member so that the worm shaft cannot rotate any more, thereby preventing a gear jam due to over-release of the rotating member.

The aspect of the present invention is not limited thereto, and other unmentioned aspects of the present invention may be clearly appreciated by those skilled in the art from the following descriptions.

In accordance with one aspect of the present invention, an electric parking brake apparatus includes: a worm shaft coupled to a motor shaft and formed with first gear teeth on an outer peripheral surface thereof and a first protrusion on the outer peripheral surface thereof on a side of the motor shaft; and a rotating member formed on an outer peripheral surface thereof with second gear teeth engaged with the first gear teeth to rotate about a hinge according to rotation of the worm shaft and on the outer peripheral surface thereof with a second protrusion that contacts the first protrusion to restrict the rotation of the worm shaft such that the rotating member does not rotate any more after rotating about the hinge by a predetermined angle.

As described above, the present invention provides an electric parking brake apparatus in which a worm shaft is formed with a first protrusion, a rotating member is formed with a second protrusion, and after the rotating member rotates by a preset rotation angle, the first protrusion of the worm shaft contacts the second protrusion of the rotating member so that the worm shaft cannot rotate any more, thereby preventing a gear jam due to over-release of the rotating member.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described with reference to the accompanying drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
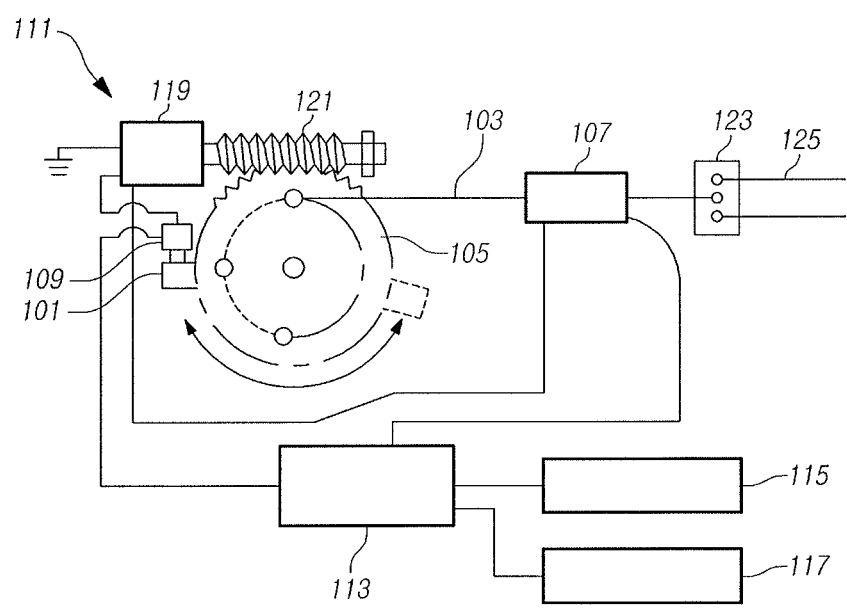
FIG. 1 illustrates a schematic configuration of an electric parking brake apparatus according to the related art.
Figure 2:
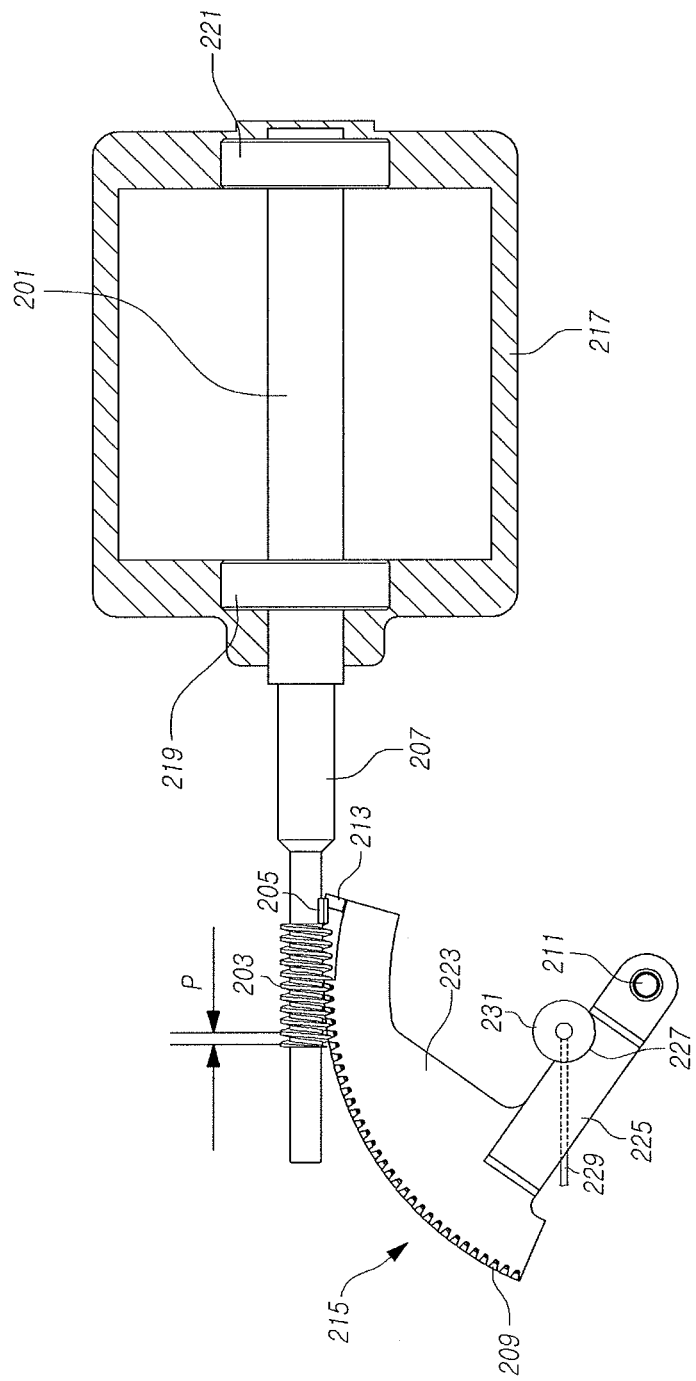
FIG. 2 illustrates an electric parking brake apparatus according to an embodiment of the present invention.
Figure 3:
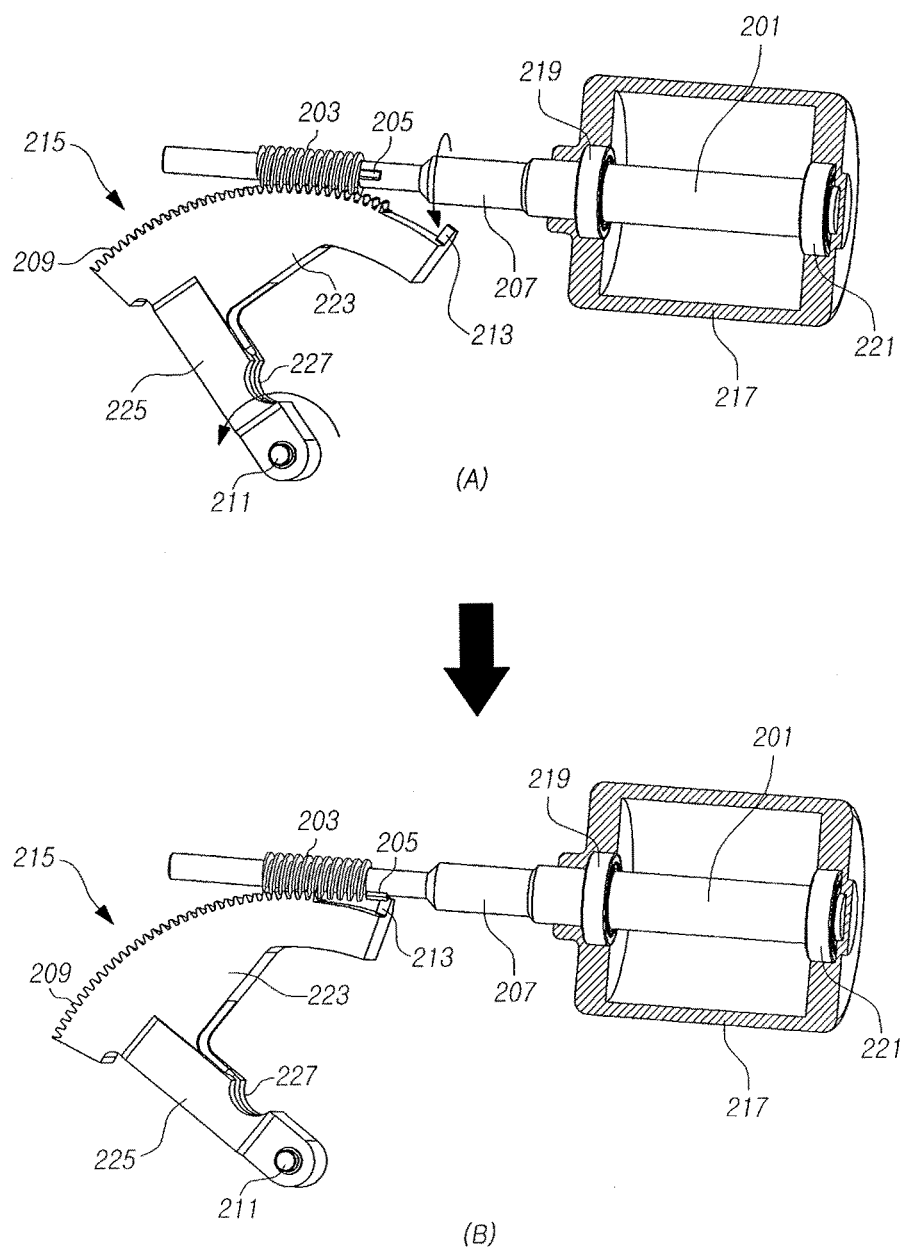
FIG. 3 illustrates an operating process of the electric parking brake apparatus illustrated in FIG. 2.

FIG. 2 illustrates an electric parking brake apparatus according to an embodiment of the present invention. FIG. 3 illustrates an operating process of the electric parking brake apparatus illustrated in FIG. 2.

As illustrated in FIGS. 2 and 3, the electric parking brake apparatus according to the embodiment of the present invention includes a worm shaft 207 coupled to a motor shaft 201 and formed with first gear teeth 203 on an outer peripheral surface thereof and a first protrusion 205 on the outer peripheral surface thereof on a side of the motor shaft 201; and a rotating member 215 formed on an outer peripheral surface thereof with second gear teeth 209 engaged with the first gear teeth 203 to rotate about a hinge 211 according to rotation of the worm shaft 207, and on the outer peripheral surface thereof with a second protrusion 213 that contacts the first protrusion 205 to restrict the rotation of the worm shaft 207 such that the rotating member 215 does not rotate any more after rotating about the hinge 211 by a predetermined angle.

A first bearing 219 and a second bearing 221 are coupled to opposite end portions of the motor shaft 201, respectively, and coupled to and supported by inner walls of a motor housing 217.

The worm shaft 207 is coupled to the motor shaft 201. For example, for coupling the worm shaft 207 and the motor shaft 201, the motor shaft 201 may be formed with a serration on an outer peripheral surface of an end portion thereof, and the worm shaft 207 may be formed at an end portion thereof with a coupling recess into which the motor shaft 201 is inserted, a serration being formed on an inner peripheral surface of the coupling recess. The motor shaft 201 and the worm shaft 207 may be coupled to each other via serration coupling.

Meanwhile, the first gear teeth 203 are formed on the outer peripheral surface of the worm shaft 207, and the first protrusion 205 is formed on the outer peripheral surface of the worm shaft 207 on a side of the motor shaft 201. That is, the first protrusion 205 is formed to protrude in a radially outward direction from the outer peripheral surface of the worm shaft 207 adjacent to a distal end of the first gear teeth 203.

The first gear teeth 203 have a pitch P of, for example, 1.85 mm, and therefore, when the worm shaft 207 makes one revolution, the rotating member 215 rotates about the hinge 211 by a rotation angle corresponding to the pitch P of 1.85 mm.

The rotating member 215 tenses or loosens a parking cable 229 while rotating about the hinge 211 to allow a parking brake to be operated or released.

The rotating member 215 is formed on the outer peripheral surface thereof with the second gear teeth 209 engaged with the first gear teeth 203 of the worm shaft 207 to tense or loosen the parking cable 299 while rotating about the hinge 211 according to the rotation of the worm shaft 207.

Meanwhile, the rotating member 215 is configured not to rotate any more after rotating about the hinge 211 by a predetermined angle (a state illustrated in (B) of FIG. 3), thereby preventing a gear jam due to over-release of the rotating member 215 (namely, a gear jam caused by disengagement of the first gear teeth 203 and the second gear teeth 209 due to excessive rotation of the rotating member 215). To this end, on the outer peripheral surface of the rotating member 215, the second protrusion 213 is formed for contacting the first protrusion 205 of the worm shaft 207 to restrict the rotation of the worm shaft 207.

Here, more specifically describing an example of a structure of the rotating member 215, the rotating member 215 may include a body part 223 having an arc shape and formed with the second gear teeth 209 on an outer peripheral surface thereof facing the worm shaft 207 and the second protrusion 213 at one end portion of the arc-shaped outer peripheral surface thereof; and a load part 255 extending from the body part 233 and formed with the hinge 211 on a distal end thereof.

The body part 223 has the arc shape and the second gear teeth 209 are formed on the outer peripheral surface of the body part 223 facing the worm shaft 207. Accordingly, when the worm shaft 207 rotates, the body part 223 also rotates about the hinge 211 in the clockwise or counter-clockwise direction.

The second gear teeth 209 are not formed on the entire outer peripheral surface of the body part 223 facing the worm shaft 207. That is, as illustrated in FIGS. 2 and 3, the body part 223 has a structure in which the second gear teeth 209 are not formed at one end portion of the outer peripheral surface thereof.

The second protrusion 213 to contact the first protrusion 205 of the worm shaft 207 is formed at one end portion of the outer peripheral surface of the body part 223 where the second gear teeth 209 are not formed.

Meanwhile, the load part 225 extends from the body part 223, and the hinge 211 is formed at the distal end of the load part 225. As illustrated in FIGS. 2 and 3, the load part 225 may be formed on the other side of the body part 223 (namely, on a side opposite to the second protrusion 213 in a circumferential direction).

Furthermore, a concave support recess 227 is formed at the load part 255, and a connection member 231 connected with the parking cable 229 is inserted to and supported by the support recess 227.

Meanwhile, the connection member 231 may be formed in a shape of a cylinder or dumbbell to which the parking cable 229 is coupled, and is not separated from the support recess 227 on account of a force by which the parking cable 229 pulls the connection member 231.

An example of operating the electric parking brake apparatus according to the embodiment of the present invention will be described with reference to the accompanying drawings.

When a driver operates a button to release a parking brake, the motor shaft 201 is accordingly rotated by the motor, and the worm shaft 207 coupled to the motor shaft 201 rotates in one direction as illustrated in (A) of FIG. 3.

When the worm shaft 207 rotates, the rotating member 215 formed on the outer peripheral surface thereof with the second gear teeth 209 engaged with the first gear teeth 203 of the worm shaft 207 rotates about the hinge 211 in one direction, and the tensed parking cable (reference numeral 229 of FIG. 2) is loosened at the same time, so that the parking brake is released.

When the rotating member 215 rotates by a preset rotation angle, the second protrusion 213 of the rotating member 215 contacts the first protrusion 205 of the worm shaft 207 as illustrated in (B) of FIG. 3. Accordingly, the worm shaft 207 cannot rotate any more, and thus, the rotating member 215 cannot rotate any more, either.

Of course, it is natural to adjust an initial location where the rotating member 215 and the worm shaft 207 are engaged with each other, so as to allow the second protrusion 213 to contact the first protrusion 205 of the worm shaft 207 after the rotating member 215 rotates by the preset rotation angle.

As described above, according to the embodiment of the present invention, it is possible to simply solve the problem that the parking brake does not operate due to the gear jam between the worm gear and the parking gear when the parking gear is over-released on account of a malfunction of the conventional release switch.

Even if it was described above that all of the components of an embodiment of the present invention are coupled as a single unit or coupled to be operated as a single unit, the present invention is not necessarily limited to such an embodiment. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

| Description of reference numerals | |
|---|---|
| 201: MOTOR SHAFT | |
| 203: FIRST GEAR TEETH | |
| 205: FIRST PROTRUSION | 207: WORM SHAFT |
| 209: SEOND GEAR TEETH | 211: HINGE |
| 213: SECOND PROTRUSION | 215: ROTATING MEMBER |

What is claimed is:

1. An electric parking brake apparatus comprising:

a worm shaft coupled to a motor shaft and formed with first gear teeth on an outer peripheral surface thereof and a first protrusion on the outer peripheral surface thereof between the first gear teeth and the motor shaft; and a rotating member formed on an outer peripheral surface thereof with second gear teeth engaged with the first gear teeth to rotate about a hinge according to rotation of the worm shaft, and on the outer peripheral surface thereof with a second protrusion that contacts the first protrusion to restrict the rotation of the worm shaft such that the rotating member does not rotate any more after rotating about the hinge by a predetermined angle.

2. The electric parking brake apparatus of claim 1, wherein the rotating member comprises:

a body part having an arc shape and formed with the second gear teeth on an outer peripheral surface thereof facing the worm shaft and the second protrusion at one end portion of the outer peripheral surface thereof facing the worm shaft; and a load part extending from the body part and formed with the hinge on a distal end thereof.

3. The electric parking brake apparatus of claim 2, wherein a concave support recess is formed at the load part, and a connection member connected with a parking cable is inserted to and supported by the support recess.

4. The electric parking brake apparatus of claim 1, wherein the first protrusion is formed to be adjacent to one end of the first gear teeth of the worm shaft.

* * * * *